(12) United States Patent
Kim et al.

(10) Patent No.: US 10,089,743 B1
(45) Date of Patent: Oct. 2, 2018

(54) METHOD FOR SEGMENTING AN IMAGE AND DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 15/725,374

(22) Filed: Oct. 5, 2017

(51) Int. Cl.
*G06K 9/34* (2006.01)
*G06T 7/11* (2017.01)
*G06N 3/08* (2006.01)
*G06K 9/66* (2006.01)

(52) U.S. Cl.
CPC ............ *G06T 7/11* (2017.01); *G06K 9/66* (2013.01); *G06N 3/08* (2013.01)

(58) Field of Classification Search
CPC ........... G06K 9/6267; G06T 7/10; G06T 7/11; G06T 7/73
See application file for complete search history.

(56) References Cited

U.S. PATENT DOCUMENTS

2017/0132468 A1* 5/2017 Mosher .............. G06K 9/00718
2017/0289617 A1* 10/2017 Song ................. H04N 21/44008

OTHER PUBLICATIONS

Bengio et al.; "Convolutional Networks for images, speech, and time-series"; Handbook of Brain Theory and Neural Networks, MIT Press; Nov. 1997.*
LeCun et al.; "Deep learning"; Nature, vol. 521; May 28, 2015.*
Lawrence et al.; "Face recognition: a convolutional neural-network approach"; IEEE Transactions on neural networks, vol. 8, No. 1; Jan. 1997.*

* cited by examiner

*Primary Examiner* — Eueng-Nan Yeh
(74) *Attorney, Agent, or Firm* — Husch Blackwell LLP (57) ABSTRACT

A method for segmenting an image using a CNN including steps of: a segmentation device acquiring (i) a first segmented image for a t-th frame by a CNN_PREVIOUS, having at least one first weight learned at a t−(i+1)-th frame, segmenting the image, (ii) optical flow images corresponding to the (t−1)-th to the (t−i)-th frames, including information on optical flows from pixels of the first segmented image to corresponding pixels of segmented images of the (t−1)-th to the (t−i)-th frames, and (iii) warped images for the t-th frame by replacing pixels in the first segmented image with pixels in the segmented images referring to the optical flow images, (iv) losses by comparing the first segmented image with the warped images, (v) a CNN_CURRENT with at least one second weight obtained by adjusting the first weight to segment an image of the t-th frame and frames thereafter by using the CNN_CURRENT.

14 Claims, 6 Drawing Sheets

METHOD FOR SEGMENTING AN IMAGE AND DEVICE USING THE SAME

FIELD OF THE INVENTION

The present invention relates to a method for segmenting an image and a segmentation device using the same; and more particularly, to the method for performing or supporting another device to perform (i) acquiring a first segmented image for a t-th frame by allowing a CNN_PREVIOUS to segment the image of the t-th frame, wherein the CNN_PREVIOUS is a CNN having at least one first weight learned at a t−(i+1)-th frame, (ii) a process of acquiring at least some optical flow images, selected among each of optical flow images which corresponds to each of a (t−1)-th frame to a (t−i)-th frame, where each of the optical flow images corresponding to each of the (t−1)-th frame to the (t−i)-th frame includes information on optical flows originating with individual pixels of the first segmented image and ending with their corresponding pixels of each of segmented images of the (t−1)-th frame to the (t−i)-th frame, and (iii) a process of acquiring one or more warped images for the t-th frame by replacing first pixels with second pixels by referring to the optical flow images, wherein the first pixels include at least some pixels of the first segmented image for the t-th frame, and the second pixels include at least some pixels in at least some of the segmented images of the (t−1)-th frame to the (t−i)-th frame, and the segmentation device performing or supporting another device to perform (i) a process of acquiring loss values by respective comparisons between the first segmented image and the warped images, (ii) a process of acquiring a CNN_CURRENT, which is a CNN with at least one second weight having been obtained by adjusting the first weight of the CNN_PREVIOUS, by using at least one of the loss values, and (iii) a process of segmenting at least one image of at least one of (i) the t-th frame and (ii) frames after the t-th frame by using the CNN_CURRENT, and the segmentation device using the same.

BACKGROUND OF THE INVENTION

Deep convolutional neural networks, or deep CNNs, are at the center of remarkable development in a deep learning field. The CNNs were already in use in the 1990s for solving character recognition problems, but they have become widely used thanks to results of recent studies. Such a deep CNN won the championship outdoing other competitors in the ImageNet Classification in 2012. Afterward, the CNNs have become a very useful tool in the field of machine learning.

Image segmentation is a method for generating a label image by partitioning an image into objects of interest, e.g., a vehicle, a human being, a road, the sky, a building, etc. Recently, as the deep learning technology has become popular, image segmentation is frequently used for deep learning.

The conventional image segmentation by using such deep learning techniques is a process of generating feature maps by applying several convolution operations to a training image using multiple convolutional layers of the CNN, then generating label images by applying several deconvolution operations to the feature maps using multiple deconvolutional layers of the CNN, acquiring loss values by comparing the acquired label images with a ground truth (GT) of the training image, and then learning the deconvolutional layers and the convolutional layers by using the acquired loss values. After that, label images of objects of interest in a test image inputted are obtained by using the learned deconvolutional layers and the learned convolutional layers.

However, such conventional image segmentation method segments the test image by using a CNN with parameters having been learned by using the training image. Therefore, when the test image whose state of a scene is radically different from that of a scene in the training image is being segmented, the segmentation results may be inaccurate. For example, when an image including a road is being segmented, the shape of the road may be different for each country, and therefore, without learning of such a specific situation, the road could fail to be segmented accurately.

As can be seen from the above, under the conventional image segmentation method, regardless of the state of the scene from which the test image for segmentation was acquired, the test image was segmented by using a pre-learned CNN. Therefore, the method failed in adapting to change in the state of the scene from which the test image for segmentation was acquired.

SUMMARY OF THE INVENTION

It is an object of the present invention to solve all problems explained above.

It is another object of the present invention to provide a method for segmenting an image to perform accurate segmentation regardless of a state of a scene from which an image is acquired and a segmentation device using the same.

It is still another object of the present invention to provide a method for segmenting an image accurately through real-time learning adaptive to varying scenes from which an image is acquired and a segmentation device using the same.

In accordance with one aspect of the present invention, there is provided a method for segmenting an image by using a CNN, including steps of: (a) a segmentation device performing or supporting another device to perform (i) a process of acquiring a first segmented image for a t-th frame by allowing a CNN_PREVIOUS to segment the image of the t-th frame, wherein the CNN_PREVIOUS is a CNN having at least one first weight learned at a t−(i+1)-th frame, (ii) a process of acquiring at least some optical flow images, selected among each of optical flow images which corresponds to each of a (t−1)-th frame to a (t−i)-th frame, wherein each of the optical flow images corresponding to each of the (t−1)-th frame to the (t−i)-th frame includes information on optical flows originating with individual pixels of the first segmented image and ending with their corresponding pixels of each of segmented images of the (t−1)-th frame to the (t−i)-th frame, and (iii) a process of acquiring one or more warped images for the t-th frame by replacing first pixels with second pixels by referring to the optical flow images, wherein the first pixels include at least some pixels of the first segmented image for the t-th frame, and the second pixels include at least some pixels in at least some of the segmented images of the (t−1)-th frame to the (t−i)-th frame; and (b) the segmentation device performing or supporting another device to perform (i) a process of acquiring loss values by respective comparisons between the first segmented image and the warped images, (ii) a process of acquiring a CNN_CURRENT, which is a CNN with at least one second weight having been obtained by adjusting the first weight of the CNN_PREVIOUS, by using at least one of the loss values, and (iii) a process of segmenting at least one image of at least one of (i) the t-th frame and (ii) frames after the t-th frame by using the CNN_CURRENT.

In accordance with another aspect of the present invention, there is provided a segmentation device for segmenting an image by using a CNN, including: a communication part for acquiring or supporting another device to acquire an image of a frame from an inputted video; and a processor for performing or supporting another device to perform (i) a process of acquiring a first segmented image for a t-th frame by allowing a CNN_PREVIOUS to segment the image of the t-th frame, wherein the CNN_PREVIOUS is a CNN having at least one first weight learned at a t−(i+1)-th frame, (ii) a process of acquiring at least some optical flow images, selected among each of optical flow images which corresponds to each of a (t−1)-th frame to a (t−i)-th frame, wherein each of the optical flow images corresponding to each of the (t−1)-th frame to the (t−i)-th frame includes information on optical flows originating with individual pixels of the first segmented image and ending with their corresponding pixels of each of segmented images of the (t−1)-th frame to the (t−i)-th frame, (iii) a process of acquiring one or more warped images for the t-th frame by replacing first pixels with second pixels by referring to the optical flow images, wherein the first pixels include at least some pixels of the first segmented image for the t-th frame, and the second pixels include at least some pixels in at least some of the segmented images of the (t−1)-th frame to the (t−i)-th frame, (iv) a process of acquiring loss values by respective comparisons between the first segmented image and the warped images, (v) a process of acquiring a CNN_CURRENT, which is a CNN with at least one second weight having been obtained by adjusting the first weight of the CNN_PREVIOUS, by using at least one of the loss values, and (vi) a process of segmenting at least one image of at least one of (vi-1) the t-th frame and (vi-2) frames after the t-th frame by using the CNN_CURRENT.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make those skilled in the art embody the present invention easily, desirable example embodiments of the present invention will be explained more specifically by referring to drawings attached.

Figure 1:
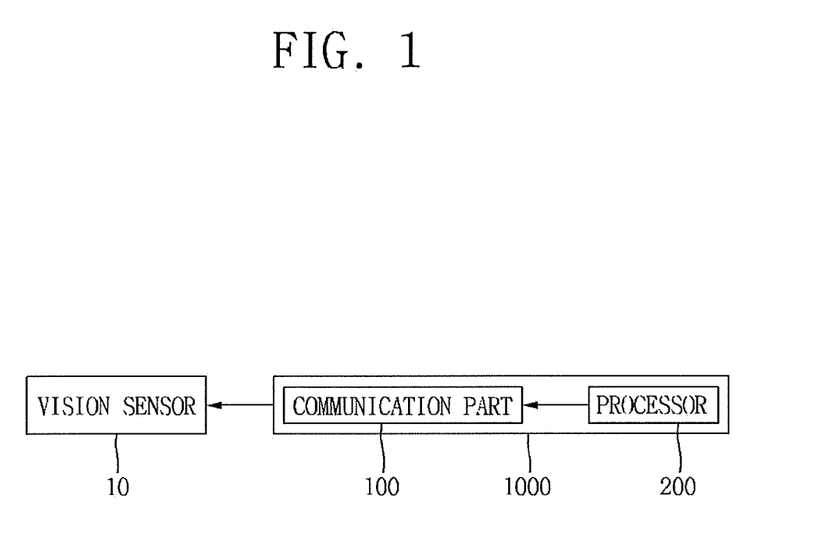
FIG. 1 is a drawing schematically illustrating a system for segmenting an image in accordance with one example embodiment of the present invention.

First of all, FIG. 1 is a drawing schematically illustrating a system for segmenting an image in accordance with one example embodiment of the present invention.

By referring to FIG. 1, the system may include a vision sensor 10 and a segmentation device 1000.

The vision sensor 10 which takes images of surroundings may include a charge coupled device (CCD), a complementary metal oxide semiconductor (CMOS), or an image capture device, etc.

Herein, FIG. 1 illustrates that the vision sensor 10, e.g., a camera, communicates with the segmentation device 1000. But the vision sensor 10 may be included in the segmentation device 1000, as the case may be.

Besides, the segmentation device 1000 may perform a process of segmenting the image inputted from the vision sensor 10 by using a CNN, a process of learning the CNN in real-time by referring to a result of the segmentation and a process of segmenting a new image by using the learned CNN in real-time.

In addition, the segmentation device 1000 may include a communication part 100 for acquiring an image of each frame inputted from the vision sensor 10 and a processor 200 for segmenting the image received from the communication part 100, learning the CNN by referring to the segmentation result, and then segmenting the new image by using the learned CNN.

More specifically, the processor 200 may perform (i) a process of acquiring a first segmented image for a t-th frame by allowing a CNN_PREVIOUS to segment the image of the t-th frame, wherein the CNN_PREVIOUS is a CNN having at least one first weight learned at a t−(i+1)-th frame, (ii) a process of acquiring at least some optical flow images, selected among each of optical flow images which corresponds to each of a (t−1)-th frame to a (t−i)-th frame, wherein each of the optical flow images corresponding to each of the (t−1)-th frame to the (t−i)-th frame includes information on optical flows originating with individual pixels of the first segmented image and ending with their corresponding pixels of each of segmented images of the (t−1)-th frame to the (t−i)-th frame, where segmented images of the (t−1)-th to the (t−i)-th frame are acquired using a CNN_PREVIOUS, and (iii) a process of acquiring one or more warped images for the t-th frame by replacing first pixels with second pixels by referring to the optical flow images, where the first pixels include at least some pixels of the first segmented image for the t-th frame, and the second pixels include at least some pixels in at least some of the segmented images of the (t−1)-th frame to the (t−i)-th frame. The terms 'pixel' or 'pixels' as herein and hereinafter used may mean 'pixel value' or 'pixel values' respectively.

In other words, the processor 200 may acquire (1) a warped image for the t-th frame which corresponds to a segmented image for the (t−1)-th frame by replacing at least some pixels of the optical flow image whose optical flows originate with the t-th frame and end with the (t−1)-th frame with at least some pixels of the segmented image for the (t−1)-th frame; and (2) a warped image for the t-th frame which corresponds to a segmented image for the (t−i)-th frame by replacing at least some pixels of the optical flow image whose optical flows originate with the t-th frame and end with the (t−i)-th frame with at least some pixels of the segmented image for the (t−i)-th frame. For reference, explanation on the other frames between the (t−1)-th frame and the (t−i)-th frame will be omitted.

After that, the processor 200 may perform (i) a process of acquiring loss values by respective comparisons between the first segmented image and the warped images, (ii) a process of acquiring a CNN_CURRENT, which is a CNN with at least one second weight having been obtained by adjusting the first weight of the CNN_PREVIOUS through the loss values, for example, by learning the CNN_PREVIOUS in the t-th frame in real-time and adjusting its parameters, and (iii) a process of segmenting at least one image of at least one of (i) the t-th frame and (ii) frames after the t-th frame by using the CNN_CURRENT.

Figure 2:
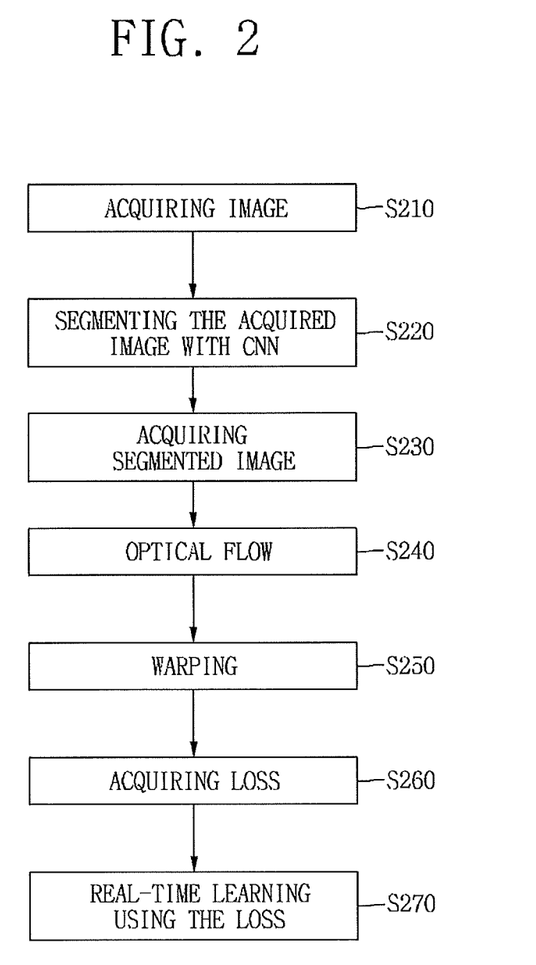
FIG. 2 is a drawing schematically illustrating a method for segmenting the image in accordance with one example embodiment of the present invention.

By referring to FIG. 2, the further explanation on the method for segmenting the image in accordance with one example embodiment of the present invention configured as shown above is as follows:

If a video taken by the vision sensor 10 is transmitted, the communication part 100 of the segmentation device 1000 may acquire each of the images of respective frames of the video data. Herein, the vision sensor 10 may be transported, installed on a vehicle or by other means of transportation, and may transmit the images of surroundings while moving.

If the video data is acquired through the communication part 100 at the step of S210, the processor 200 of the segmentation device 1000 may segment the image of the t-th frame by using the CNN_PREVIOUS at the step of S220, which is the CNN having the first weight learned at the t−(i+1)-th frame and acquire the first segmented image for the t-th frame at the step of S230.

Figure 3:
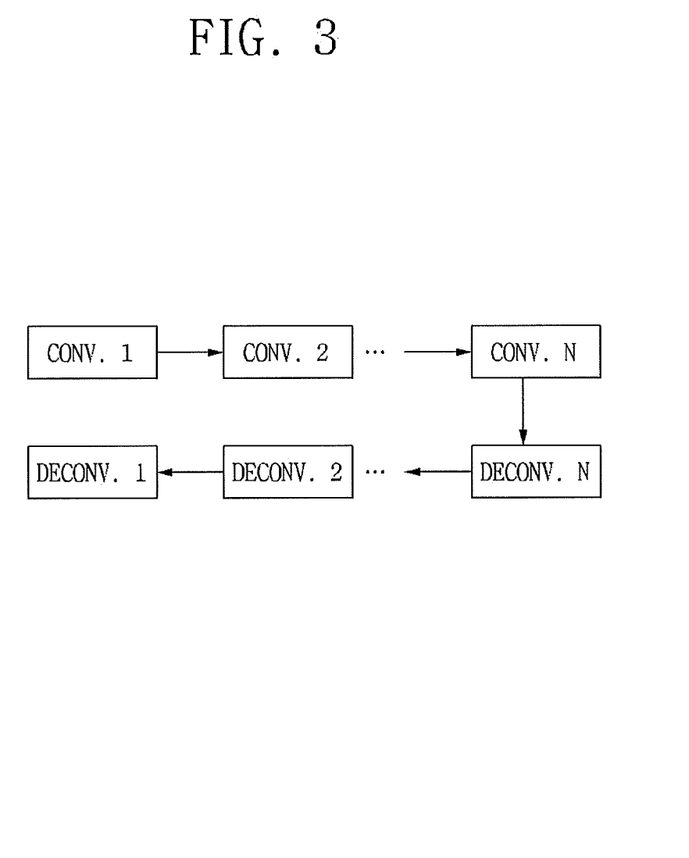
FIG. 3 is a drawing schematically illustrating a CNN that segments the image in accordance with one example embodiment of the present invention.

To further explain one example of segmenting the image by using the CNN by referring to FIG. 3, at least one feature map is generated by multiple convolutional layers CONV.1, CONV.2, and CONV.N, in the applying order as shown, of the CNN capable of applying several convolution operations to the image. Herein, the number of the multiple convolutional layers may be as large as desired.

After that, each label image for each of objects of interest is acquired by multiple deconvolutional layers DECONV.N, DECONV.2, and DECONV.1, in the applying order as shown, of the CNN capable of applying several deconvolution operations to the finally generated feature map. Herein, the number of the multiple deconvolutional layers may be as large as desired.

Herein, a structure of encoding the image by applying convolution operations to generate the feature map, and decoding the generated feature map to thereby acquire a label image is called an encoding-decoding network or a U-Net. Whenever each convolution operation is performed during the encoding, a size of the image may be reduced by a half to decrease computational load while the number of channels of the image may be increased twice to acquire a complicated pattern through the increased channels. As a result, the reduced-sized feature map may include mostly low-frequency regions, as much high-frequency regions are removed. Such low-frequency regions may represent meaningful parts, i.e., the sky, a road, a building, a vehicle, etc. and individual label images may be inferred from such meaningful parts by applying deconvolution operations, i.e., decoding operations. The segmented image may be acquired by placing each of the label images corresponding to the objects of interest in a corresponding area of the input image. As the case may be, a segmented image including only a label image corresponding to a specified object of interest may be acquired.

The above description referring to FIG. 3 is only for exemplary explanation of segmenting by using the CNN, but the process of segmentation by using the CNN in accordance with the present invention is not limited to this.

Again, by referring to FIG. 2, the processor 200 may acquire at least some optical flow images, selected among each of the optical flow images which corresponds to each of the (t−1)-th frame to the (t−i)-th frame, where the optical flow images include information on optical flows originating with individual pixels of the first segmented image, acquired by using the CNN_PREVIOUS, and ending with their corresponding pixels of some of segmented images of the (t−1)-th frame to the (t−i)-th frame, at the step of S240.

Figure 4:
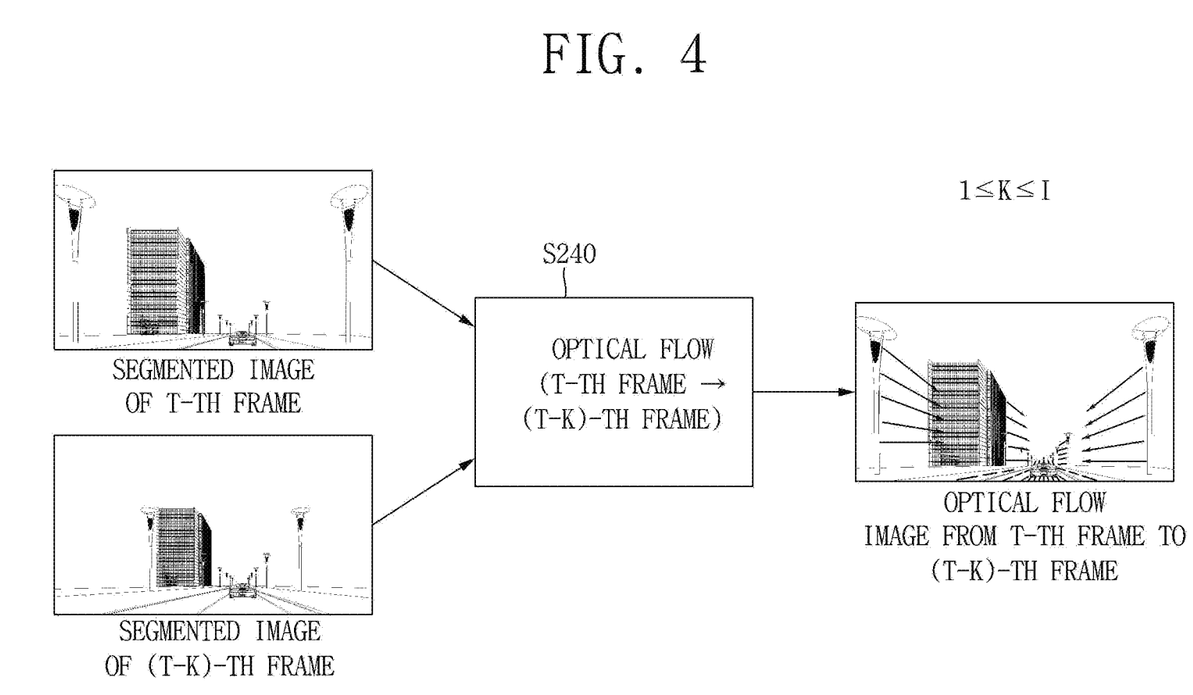
FIG. 4 is a drawing schematically illustrating a process of acquiring an optical flow image under a method for segmenting the image in accordance with one example embodiment of the present invention.

In other words, as shown in FIG. 4, to confirm a motion of an object from the t-th frame to the (t−1)-th frame, the processor 200 may acquire the optical flow image whose optical flows originate with the t-th frame and end with the (t−1)-th frame. Further, the processor 200 may acquire each of the optical flow images which corresponds to each of the (t−2)-th frame to the (t−K)-th frame, where 1≤K≤i, where each of the optical flow images corresponding to each of the (t−2)-th frame to the (t−K)-th frame includes information on optical flows originating with the pixels of the first segmented image and ending with their corresponding pixels of each of the segmented images of the (t−2)-th frame to the (t−K)-th frame.

Herein, i may be at least one integer equal to or greater than 1 and a cycle of frames for learning the CNN in real-time in accordance with one example embodiment of the present invention may be set as (i+1). In addition, as many optical flow images as desired to perform learning at real-time may be acquired. As an example, each of the optical flow images, (i) corresponding to each of all the segmented images of the (t−1)-th frame to the (t−i)-th frame, or (ii) corresponding to each of the segmented images of one or more specified frames selected among the (t−1)-th frame to the (t−i)-th frame may be acquired. In addition, as another example of learning the CNN in real-time conducted at the cycle of (i+1) frames, an optical flow image corresponding to the segmented image only of the (t−1)-th frame may be acquired in case the (t−1)-th frame includes a scene whose state is most similar to a state of a scene in the t-th frame. This means that objects in the (t−1)-th frame showed least movement compared to that in the t-th frame.

In addition, upon acquiring each of the optical flow images, if a new object not present in the segmented images of the (t−1)-th frame to the (t−i)-th frame appears in the first segmented image, the processor 200 may determine the new object as being correspond to a background or as being correspond to a certain object present in the segmented images of the (t−1)-th frame to the (t−i)-th frame. As one example, if a first building appears at a long distance in the first segmented image, the processor 200 may create information on optical flows by which the first building becomes a second building at a long distance in the segmented image of the (t−i)-th frame.

Next, the processor 200 may acquire the warped images for the t-th frame by replacing the first pixels with the second pixels by referring to the optical flow images, at the step of S250.

Figure 5:
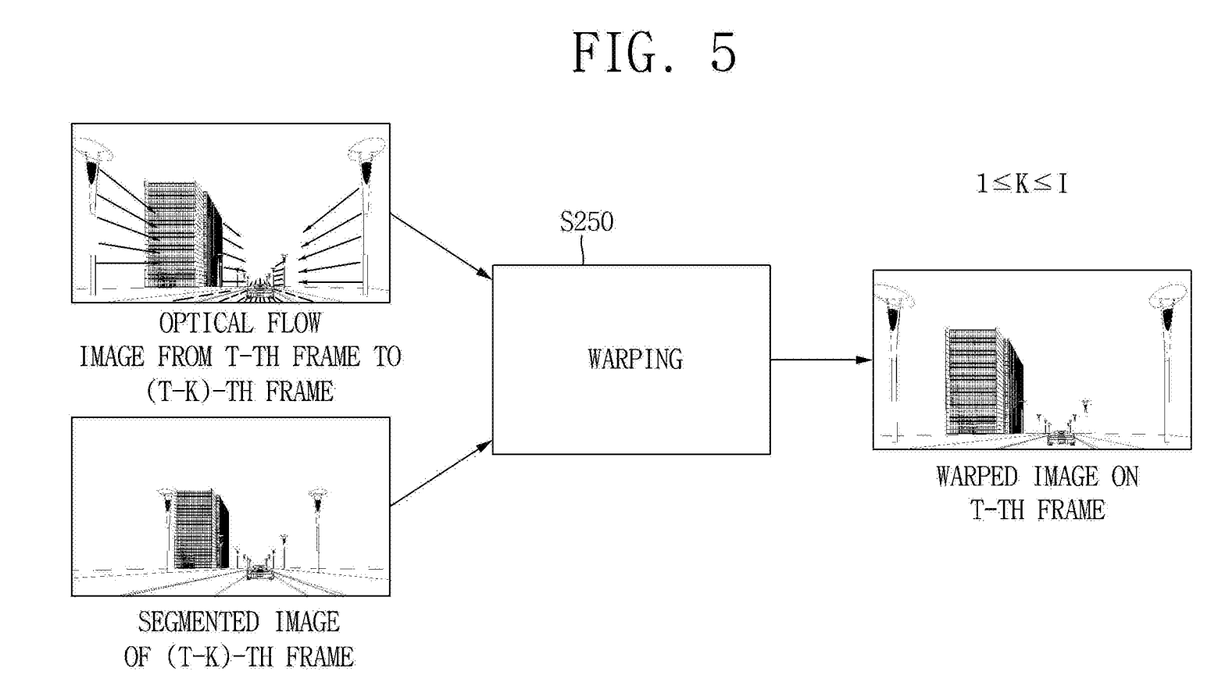
FIG. 5 is a drawing schematically illustrating a process of acquiring a warped image under a method for segmenting the image in accordance with one example embodiment of the present invention.

In other words, the processor 200 may identify which pixels of the segmented image for the t-th frame correspond to which pixels of the respective segmented images of the (t−1)-th frame to the (t−K)-th frame, where 1≤K≤i, by referring to the optical flow images. Therefore, in order to set individual pixels of the segmented image for the t-th frame to their corresponding pixels of at least some of the respective segmented images of the (t−1)-th frame to the (t−K)-th frame by using the information on optical flows included in the optical flow images, as shown in FIG. 5, the processor 200 may acquire the warped images for the t-th frame by replacing at least some pixels of the first segmented image for the t-th frame with at least some pixels in at least some of the segmented images of the (t−1)-th frame to the (t−K)-th frame, at the step of S250. Herein, the warped images may function as ground truth images for the t-th frame.

This could be explained more specifically as follows:

In general, upon learning a CNN, loss values are acquired by comparing a result, outputted from FC layer of the CNN into which a training image is inputted, with a GT image acquired from the training image, and then parameters of the CNN are adjusted by referring to the acquired loss values.

However, if an image, i.e., a scene viewed from a moving vehicle, is inputted to the learned CNN in real-time, the GT image for the image cannot be acquired and therefore, a so-called real-time learning is impossible. Clearly, if a user can set the GT in the image in real-time, the real-time learning may be possible. However, it takes a time for the user to input GT information for each of frames, therefore, there is no way of acquiring GT information for each of frames in real-time. Contrary to the conventional CNN, the CNN in accordance with one example embodiment of the present invention can be learned in real-time by using the warped images, because the GT image required for learning the CNN is acquired by using the warped images.

Accordingly, for the real-time learning at the t-th frame, the processor 200 may acquire the loss values by the respective comparisons between the first segmented image of the t-th frame and its corresponding warped images at the step of S260.

Besides, the processor 200 may acquire the CNN_CURRENT with the second weight through the real-time learning by using at least one of the loss values at the step of S270 and may segment at least one image of the t-th frame or frames after the t-th frame by using the CNN_CURRENT.

Herein, upon acquiring the CNN_CURRENT by learning the CNN_PREVIOUS at the current frame in real-time, the processor 200 may acquire the second weight ($w'_{(x1)1}$ in Equation 1 below) of the CNN_CURRENT by applying adjusted values $(\delta_1 \frac{df_1(e)}{de} x_1)$ in Equation 1) of the CNN_PREVIOUS, having been learned using at least one of loss values, to the first weight $w_{(x1)1}$ (in Equation 1), where respective amounts of applying the adjusted values are determined by referring to their corresponding ratios.

Figure 6:
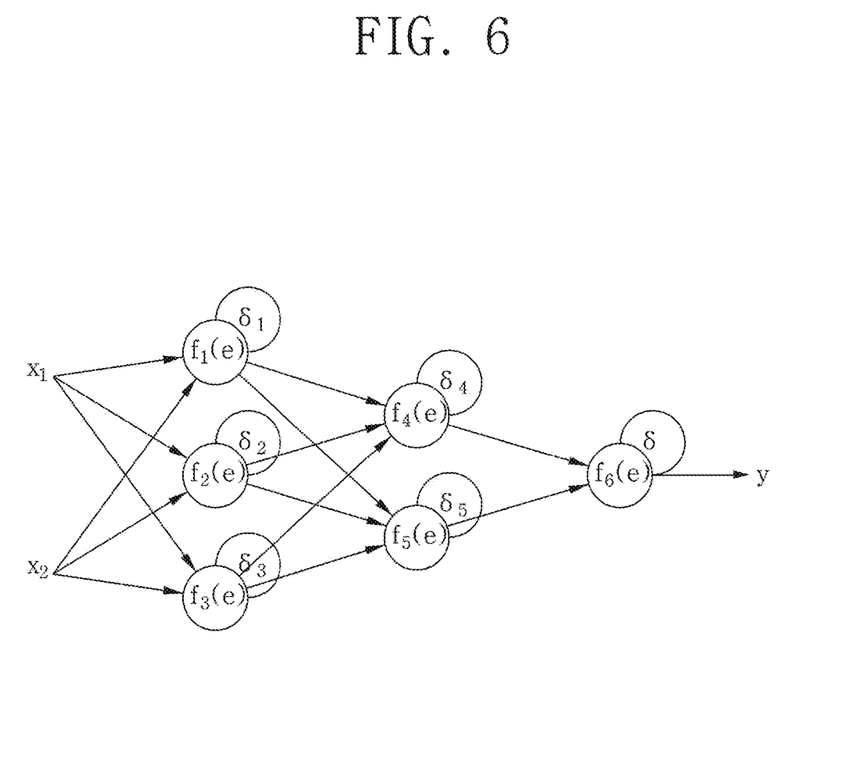
FIG. 6 is a drawing schematically showing a process of learning the CNN in real-time under a method for segmenting the image in accordance with one example embodiment of the present invention.

In short, as shown in FIG. 6, the CNN comprised of multiple neural layers may update $w_{(x1)1}$ and $w_{(x2)1}$ which are weights of an $f_1(e)$ neural layer of the CNN to $w'_{(x1)1}$, and $w'_{(x2)1}$, respectively, by using the loss value of $\delta_1$.

Herein, $w'_{(x1)1}$ and $w'_{(x2)1}$ may be expressed as shown in Equation 1 below.

$$w'_{(x1)1} = w_{(x1)1} + \eta \delta_1 \frac{df_1(e)}{de} x_1 \quad \langle\text{Equation 1}\rangle$$

$$w'_{(x2)1} = w_{(x2)1} + \eta \delta_1 \frac{df_1(e)}{de} x_2$$

In Equation 1, η may be at least one parameter determining how much the weights would be changed, the variable y is an output signal (i.e., a segmented image), x1 and x2 are input signals, and e is an output signal and represents linear combinations of x's and w's. In one example embodiment of the present invention, by setting the η to a very small value, e.g., the value from 0.001 to 0.01, the second weight may be determined by slightly adjusting the first weight, resulting in the CNN with its weights adapted to a current situation in real-time. Herein, slight changes of the weights help the adaptation. If the weights are set as changing greatly, i.e., if the applied ratios of the adjusted values are increased, the parameters of the CNN optimized through the learning by using the training image may be greatly changed by real-time learning, and this may cause instability of the CNN.

In addition, if the CNN_PREVIOUS is learned in real-time by using at least one of the loss values acquired by the respective comparisons between the first segmented image of the t-th frame and its corresponding warped images, the processor 200 may apply different weights to the loss values corresponding to the warped images of the t-th frame. As an example, the largest value may be allocated to the weight corresponding to the segmented image of the (t−1)-th frame. The weight may be smaller toward the (t−i)-th frame or vice versa. As another example, the processor 200 may set the weight of the loss value calculated by using the warped image of the t-th frame corresponding to the segmented image for the (t−1)-th frame as maximum and other weights to be identical to each other. In other words, the processor 200 may allow the real-time learning by using a state of a scene most similar to that of a scene from which the image of the t-th frame is acquired by allocating the largest weight to a specific loss value corresponding to the segmented image of the (t−1)-th frame.

Similar to the case of applying different weights to the loss values, the processor 200 may apply different weights to the adjusted values. In other words, the processor 200 may apply η in Equation 1 in a different way in the real-time learning by using each of the loss values acquired per frame.

Thereafter, the processor 200 may acquire a second segmented image of the t-th frame by segmenting the image thereof with the CNN_CURRENT having the second weight learned in real-time, or by determining at least one of the warped images of the t-th frame as the segmented image of the t-th frame.

In other words, as the warped images of the t-th frame are images corresponding to the GT images expected to be outputted from the image of the t-th frame by the segmentation using the CNN_PREVIOUS, the warped images of the t-th frame may be regarded as the segmented images of the t-th frame, but there could be slight errors because segmentation information on the new object present in the t-th frame does not exist in the segmented images of the (t−i)-th frame. Accordingly, if the segmentation information on the new object in the t-th frame is required, the image of the t-th frame may be segmented again by using the CNN_CURRENT learned in real-time to acquire the second segmented image.

It was explained above that the operation is performed by the processor 200 in the segmentation device 1000, but it may be configured that individual neural layers which form the CNN be operated by one or more other processors and that these processors be located in a single device or several devices.

The present invention has an effect of segmenting the image more accurately by learning the CNN in real-time, regardless of the state of the scene from which the image for the segmentation is acquired.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A segmentation device for segmenting an image by using a CNN, comprising:
   a communication part for acquiring or supporting another device to acquire an image of a frame from an inputted video; and
   a processor for performing or supporting another device to perform (i) a process of acquiring a first segmented image for a t-th frame by allowing a CNN_PREVIOUS to segment the image of the t-th frame, wherein the CNN_PREVIOUS is a CNN having at least one first weight learned at a t−(i+1)-th frame, (ii) a process of acquiring at least some optical flow images, selected among each of optical flow images which corresponds to each of a (t−1)-th frame to a (t−i)-th frame, wherein each of the optical flow images corresponding to each of the (t−1)-th frame to the (t−i)-th frame includes information on optical flows originating with individual pixels of the first segmented image and ending with their corresponding pixels of each of segmented images of the (t−1)-th frame to the (t−i)-th frame, where the segmented images of the (t−1)-th to the (t−i)-th frame are acquired using a CNN_PREVIOUS, (iii) a process of acquiring one or more warped images for the t-th frame by replacing first pixels with second pixels by referring to the optical flow images, wherein the first pixels include at least some pixels of the first segmented image for the t-th frame, and the second pixels include at least some pixels in at least some of the segmented images of the (t−1)-th frame to the (t−i)-th frame, (iv) a process of acquiring loss values by respective comparisons between the first segmented image and the warped images, (v) a process of acquiring a CNN_CURRENT, which is a CNN with at least one second weight having been obtained by adjusting the first weight of the CNN_PREVIOUS, by using at least one of the loss values, and (vi) a process of segmenting at least one image of at least one of (vi-1) the t-th frame and (vi-2) frames after the t-th frame by using the CNN_CURRENT;
   where "i" is a predetermined integer corresponding to a cardinal number of image frames placed between a frame at which CNN_PREVIOUS is acquired and a frame at which CNN_CURRENT is acquired.

2. The segmentation device of claim 1, wherein, at the processes of (iv) and (v), the processor acquires or supports another device to acquire (i) a second segmented image for the t-th frame by allowing the CNN_CURRENT to segment the image of the t-th frame, or (ii) at least one of the warped images as a revised segmented image for the t-th frame.

3. The segmentation device of claim 1, wherein the processor performs or supports another device to perform the processes (i) to (vi) at a cycle of (i+1) frames.

4. The segmentation device of claim 1, wherein, at the process of (v), the segmentation device, upon learning the CNN_PREVIOUS at the t-th frame in real-time by using at least one of the loss values, allocates or supports another device to allocate different weights to the loss values.

5. The segmentation device of claim 4, wherein the processor allocates or supports another device to allocate a largest weight to a specific loss value among the loss values which corresponds to a specific warped image, acquired by using the (t−1)-th frame, among the warped images.

6. The segmentation device of claim 1, wherein, at the process of (v), the processor, upon acquiring the CNN_CURRENT by learning the CNN_PREVIOUS at the t-th frame in real-time, acquires or supports another device to acquire the second weight by applying adjusted values of the CNN_PREVIOUS having been learned using at least one of the loss values, to the first weight, wherein respective amounts of applying the adjusted values are determined by referring to their corresponding ratios.

7. The segmentation device of claim 1, wherein, at the process of (ii), the processor, upon acquiring each of the optical flow images, if a new object not present in the segmented images of the (t−1)-th frame to the (t−i)-th frame appears in the first segmented image, determines or supports another device to determine the new object as a background or as an object present in the segmented images of the (t−1)-th frame to the (t−i)-th frame.

8. A method for segmenting an image by using a CNN, comprising steps of:
(a) a segmentation device performing or supporting another device to perform (i) a process of acquiring a first segmented image for a t-th frame by allowing a CNN_PREVIOUS to segment the image of the t-th frame, wherein the CNN_PREVIOUS is a CNN having at least one first weight learned at a t−(i+1)-th frame, (ii) a process of acquiring at least some optical flow images, selected among each of optical flow images which corresponds to each of a (t−1)-th frame to a (t−i)-th frame, wherein each of the optical flow images corresponding to each of the (t−1)-th frame to the (t−i)-th frame includes information on optical flows originating with individual pixels of the first segmented image and ending with their corresponding pixels of each of segmented images of the (t−1)-th frame to the (t−i)-th frame, where the segmented images of the (t−1)-th to the (t−i)-th frame are acquired using a CNN_PREVIOUS, and (iii) a process of acquiring one or more warped images for the t-th frame by replacing first pixels with second pixels by referring to the optical flow images, wherein the first pixels include at least some pixels of the first segmented image for the t-th frame, and the second pixels include at least some pixels in at least some of the segmented images of the (t−1)-th frame to the (t−i)-th frame; and
(b) the segmentation device performing or supporting another device to perform (i) a process of acquiring loss values by respective comparisons between the first segmented image and the warped images, (ii) a process of acquiring a CNN_CURRENT, which is a CNN with at least one second weight having been obtained by adjusting the first weight of the CNN_PREVIOUS, by using at least one of the loss values, and (iii) a process of segmenting at least one image of at least one of (i) the t-th frame and (ii) frames after the t-th frame by using the CNN_CURRENT;

where "i" is a predetermined integer corresponding to a cardinal number of image frames placed between a frame at which CNN_PREVIOUS is acquired and a frame at which CNN_CURRENT is acquired.

9. The method of claim 8, wherein, at the step of (b), the segmentation device acquires or supports another device to acquire (i) a second segmented image for the t-th frame by allowing the CNN_CURRENT to segment the image of the t-th frame, or (ii) at least one of the warped images as a revised segmented image for the t-th frame.

10. The method of claim 8, wherein the segmentation device performs or supports another device to perform the steps (a) and (b) at a cycle of (i+1) frames.

11. The method of claim 8, wherein, at the step of (b), the segmentation device, upon learning the CNN_PREVIOUS at the t-th frame in real-time by using at least one of the loss values, allocates or supports another device to allocate different weights to the loss values.

12. The method of claim 11, wherein the segmentation device allocates or supports another device to allocate a largest weight to a specific loss value among the loss values which corresponds to a specific warped image, acquired by using the (t−1)-th frame, among the warped images.

13. The method of claim 8, wherein, at the step of (b), the segmentation device, upon acquiring the CNN_CURRENT by learning the CNN_PREVIOUS at the t-th frame in real-time, acquires or supports another device to acquire the second weight by applying adjusted values of the CNN_PREVIOUS having been learned using at least one of the loss values, to the first weight, wherein respective amounts of applying the adjusted values are determined by referring to their corresponding ratios.

14. The method of claim 8, wherein, at the step of (a), the segmentation device, upon acquiring each of the optical flow images, if a new object not present in the segmented images of the (t−1)-th frame to the (t−i)-th frame appears in the first segmented image, determines or supports another device to determine the new object as a background or as an object present in the segmented images of the (t−1)-th frame to the (t−i)-th frame.

* * * * *